(12) United States Patent
Li et al.

(10) Patent No.: US 12,119,861 B2
(45) Date of Patent: Oct. 15, 2024

(54) MAGNETIC HOUSING FOR MOBILE DEVICE AND MANUFACTURING PROCESS THEREOF

(71) Applicant: LUXSHARE PRECISION INDUSTRY COMPANY LIMITED, Shenzhen (CN)

(72) Inventors: XianFeng Li, Shenzhen (CN); Hua Yi, Shenzhen (CN); HongBing Yin, Shenzhen (CN); LinBiao Hu, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 405 days.

(21) Appl. No.: 17/579,953

(22) Filed: Jan. 20, 2022

(65) Prior Publication Data
US 2022/0294485 A1   Sep. 15, 2022

(30) Foreign Application Priority Data
Mar. 9, 2021   (CN) .......................... 202120497620.6

(51) Int. Cl.
*H04B 1/3888*   (2015.01)
*B29C 45/14*   (2006.01)
(Continued)

(52) U.S. Cl.
CPC ..... *H04B 1/3888* (2013.01); *B29C 45/14065* (2013.01); *B29C 45/1418* (2013.01); *H01F 7/0263* (2013.01); *B29L 2031/3431* (2013.01)

(58) Field of Classification Search
CPC ........... B29C 45/14065; B29C 45/1418; B29L 2031/3431; H01F 27/022; H01F 27/366;
(Continued)

(56) References Cited

U.S. PATENT DOCUMENTS

2016/0294427 A1 * 10/2016 Wojcik ................. H04B 1/3888
2017/0201108 A1 *  7/2017 You .......................... H02J 50/12

FOREIGN PATENT DOCUMENTS

KR   102506374 B1 *  6/2019 .............. H02J 50/70

OTHER PUBLICATIONS

Translation of Publication No. KR102506374B1, printed on Jul. 29, 2024, retrieved from Internet: <https://patents.google.com/patent/KR102506374B1/en?oq=KR102506374B1> (Year: 2024).*

* cited by examiner

*Primary Examiner* — Ronald Eisner
(74) *Attorney, Agent, or Firm* — Birch, Stewart, Kolasch & Birch, LLP

(57) ABSTRACT

The present disclosure provides a magnetic housing for mobile device and a manufacturing process of the magnetic housing. The magnetic housing includes a housing body, an outer sleeve, a magnetic coil, and an inner lining. The housing body comprises a bearing part and a surrounding part. The surrounding part is connected to and intersecting with an outer periphery of the bearing part to form an accommodating space. The accommodating space accommodates a mobile device. The bearing part comprises a groove. The outer sleeve is disposed on a surface of the housing body away from the accommodating space. The magnetic coil is disposed in the groove. The inner lining is disposed on a surface of the housing body close to the accommodating space. The overall thickness of the housing for mobile device would not be increased when magnetic coils are disposed.

17 Claims, 4 Drawing Sheets

(51) Int. Cl.
 *H01F 7/02* (2006.01)
 *B29L 31/34* (2006.01)
(58) Field of Classification Search
 CPC .......... H01F 38/14; H01F 5/00; H01F 7/0263; H04B 1/03–0346; H04B 1/3888; H04B 2001/3894
 See application file for complete search history.

MAGNETIC HOUSING FOR MOBILE DEVICE AND MANUFACTURING PROCESS THEREOF

CROSS-REFERENCE TO RELATED APPLICATION

This application claims the priority benefit of Chinese Patent Application Serial Number 202120497620.6, filed on Mar. 9, 2021, the full disclosure of which is incorporated herein by reference.

BACKGROUND

Technical Field

The present disclosure relates to the technical field of housing for mobile devices, particularly to a magnetic housing for mobile devices with a magnetic coil which are directly disposed and a manufacturing process of the magnetic housing.

Related Art

Mobile devices such as mobile phones or tablets are essentials in modern life. Not only the mobile devices can be used for communication and information transmission, but also can be used as a media device for video and games, or, even as a GPS for vehicle drivers. Some of the conventional mobile devices are equipped with wireless charging modules on the inner side. In order to increase the charging efficiency, when the wireless charging module is placed on the charging board for charging, the coils of the two wireless charging modules would be correspondingly aligned, and the wireless charging module of the mobile device would be equipped with a magnetic member, to cooperate with the magnetic members of the charging board to perform mutual alignment. Besides, it can also be combined with a magnetic bracket for positioning by a magnetic member. To cooperate with wireless charging modules of the conventional mobile devices, the housing for conventional mobile devices (protective case) would also be equipped with magnetic coil members, which are bonded to the mobile device housing by adhesive to greatly increase the thickness of the mobile device housing.

SUMMARY

The embodiments of the present disclosure provide a magnetic housing for mobile device tended to solve the problem of the increasing of the thickness of conventional magnetic housing for mobile device.

The present disclosure provides a magnetic housing for mobile device, comprising a housing body, an outer sleeve, a magnetic coil, and an inner lining. The housing body comprises a bearing part and a surrounding part. The surrounding part is connected to and intersecting with an outer periphery of the bearing part to form an accommodating space. The accommodating space accommodates a mobile device. The bearing part comprises a groove. The outer sleeve is disposed on a surface of the housing body away from the accommodating space. The magnetic coil is disposed in the groove and comprises a coil and a magnetic body. The inner lining is disposed on a surface of the housing body close to the accommodating space.

In the embodiments of the present disclosure, by disposing grooves in the housing body, and by disposing magnetic coils are in the grooves, the overall thickness of the housing for mobile device would not be increased when magnetic coils are disposed. The outer sleeve can be made by a liquid silicone liquid-to-solid molding method, which can further reduce the thickness of the housing for mobile device. Thus, the overall thickness of the housing for mobile device can be reduced to no thicker than 2.1 mm.

The present disclosure provides a manufacturing process of a magnetic housing for accommodating a mobile device, comprising: forming a housing body by injection molded, wherein the housing body comprises a bearing part and a surrounding part, the surrounding part is connected to and intersecting with an outer periphery of the bearing part to form an accommodating space, and the bearing part comprises a groove; wherein a magnetic coil is disposed in the groove, and the magnetic coil comprises a coil and a magnetic body, wherein an inner lining is disposed on a surface of the housing body close to the accommodating space; and forming an outer sleeve by solid silicone formed by liquid silicone in a liquid-to-solid molding manner, wherein the outer sleeve is disposed on a surface of the housing body away from the accommodating space.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
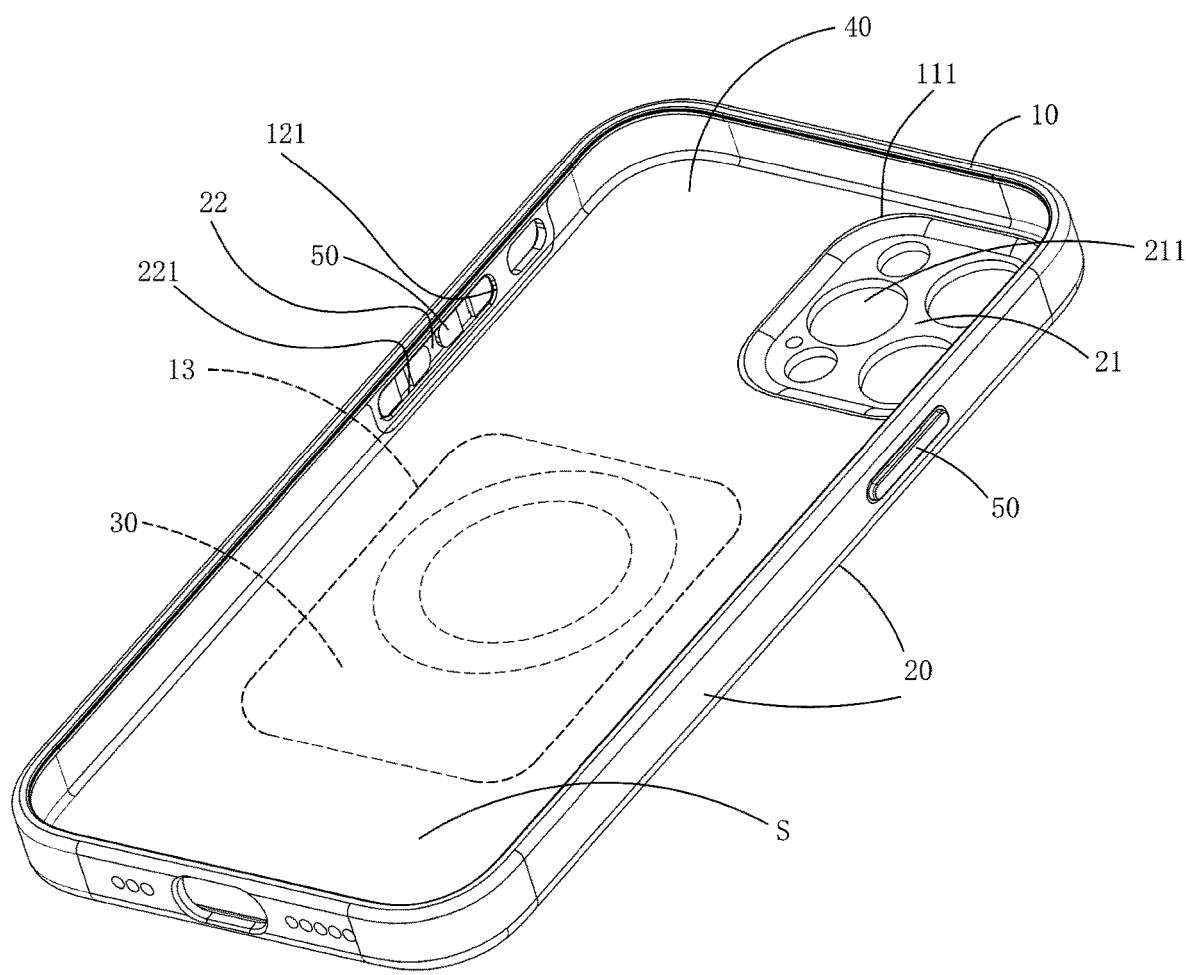
FIG. 1 is a perspective view of a magnetic housing for mobile device of an embodiment of the present disclosure.
Figure 2:
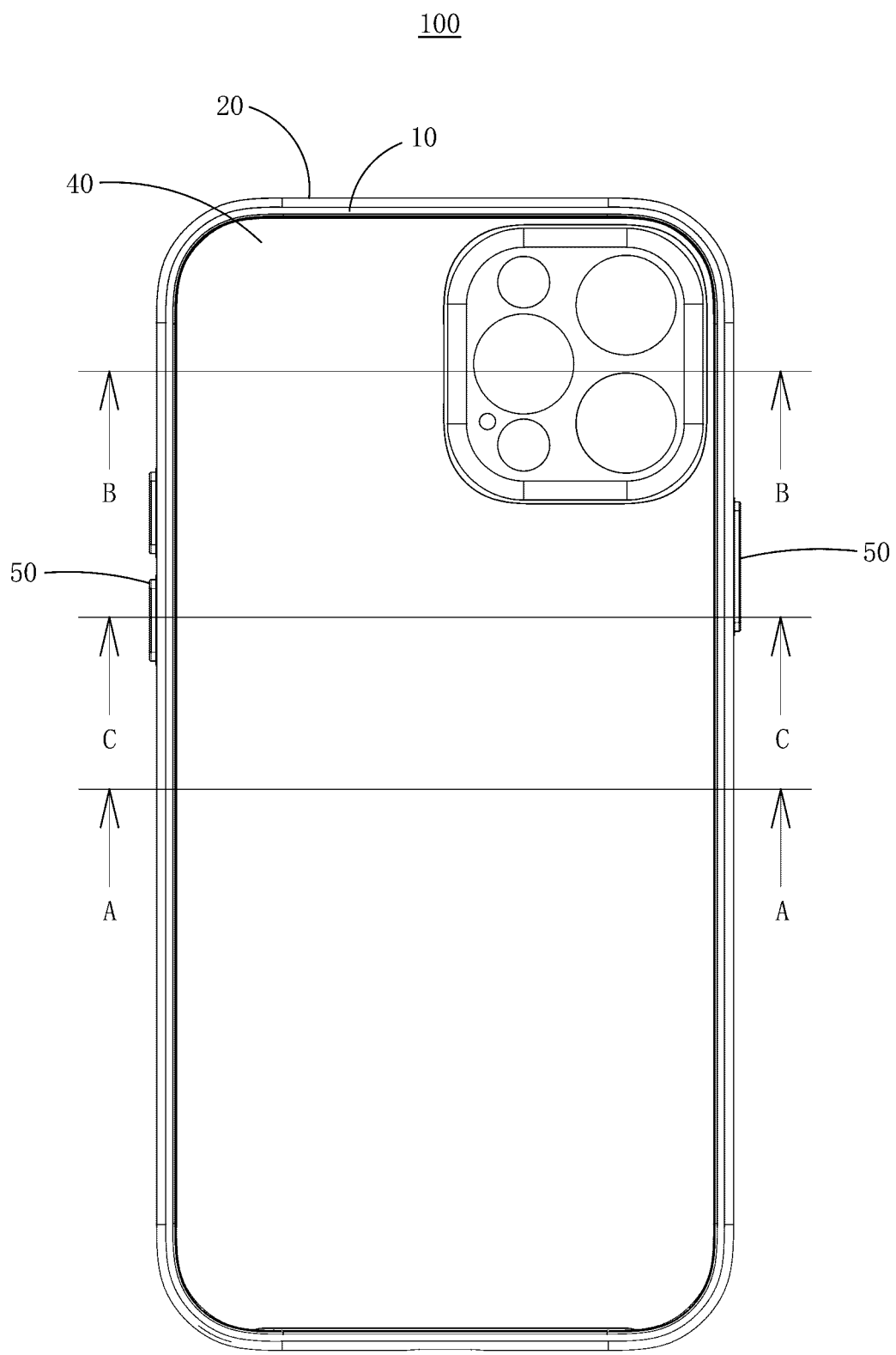
FIG. 2 is a top view of the magnetic housing for mobile device of FIG. 1.
Figure 3:
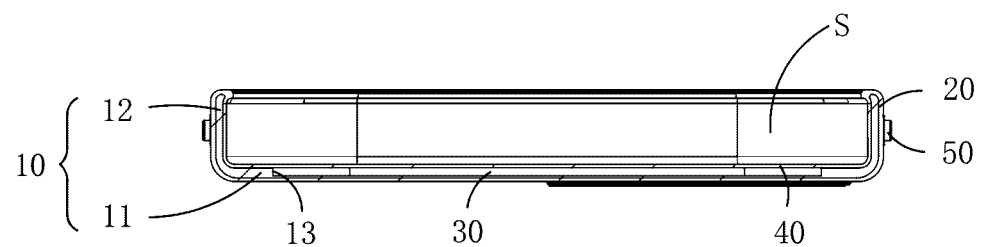
FIG. 3 is a cross-sectional view of the magnetic housing for mobile device along line A-A of FIG. 2.

FIG. 1 is a perspective view of a magnetic housing for mobile device of an embodiment of the present disclosure. FIG. 2 is a top view of the magnetic housing for mobile device of FIG. 1. FIG. 3 is a cross-sectional view of the magnetic housing for mobile device along line A-A of FIG. 2. As shown in the figure, in this embodiment, the magnetic housing for mobile device comprises a housing body 10, an outer sleeve 20, a magnetic coil 30, and an inner lining 40.

In some embodiments, the housing body 10 comprises polycarbonate (PC). For example, the housing body 10 is formed by injection molding. The material of the housing body 10 can be made of polycarbonate with higher hardness when molded. The housing body 10 comprises a bearing part 11 and a surrounding part 12 (shown in FIG. 3 to FIG. 5). The surrounding part 12 is connected to and intersects with an outer periphery of the bearing part 11 to form an accommodating space S. In this embodiment, the surrounding part 12 is orthogonal to the bearing part 11. The accommodating space S accommodates mobile devices. When mobile devices are placed in the accommodating space S, the backside of the mobile device is carried on the bearing part 11. The surrounding part 12 abuts against an outer periphery surface of the mobile device. In some embodiments, a magnetic housing for mobile device 100 further comprises a pressing member 50 disposed at the surrounding part 12. In some embodiments, the number of the pressing members 50 is multiple. In some embodiments, the pressing member 50 could also be formed by injection molding, which can be made of polycarbonate with higher hardness w % ben molded.

In some embodiments, the bearing part 11 comprises a groove 13. The groove 13 can be formed on a surface of the bearing part 11 close to the accommodating space S by a computer-digital controlled milling machine. The magnetic coil 30 is disposed in the groove 13, for example, the magnetic coil can be glued to a bottom surface of the groove 13. The magnetic coil 30 comprises a coil and a magnetic body, and could be, for example, a MagSafe module of MFi. The groove 13 of this embodiment is provided on a surface of the bearing part 11 close to the accommodating space S, but it is not limited to thereto. In another embodiment, the groove in which the magnetic coil is disposed could also be formed on a surface of the bearing part away from the accommodating space. In the present disclosure, the coil and the magnetic body are disposed in the groove 13 to greatly reduce the thickness of the magnetic housing for mobile device 100 and increase the accommodating space for the accommodating space S. In some embodiments, the coil is a protocol recognition coil or a charging coil.

In some embodiments, the outer sleeve 20 is disposed on a surface of the housing body 10 away from the accommodating space S. In some embodiments, the outer sleeve 20 comprises a liquid-to-solid molded silica gel. For example, the outer sleeve 20 could be formed on a surface of the housing body 10 away from the accommodating space S in a liquid-to-solid molding manner of liquid silicone. One side of the formed outer sleeve 20 is thin and relatively stable, which is thinner than the thickness of a housing produced by conventional liquid silicone injection molding technology. Thus, the outer sleeve 20 can be made of silicone. The flexibility of the outer sleeve 20 is greater than the flexibility of the housing body 10, and the hardness of the outer sleeve 20 is less than the hardness of the housing body 10.

In this embodiment, the outer sleeve 20 is disposed on a surface of the bearing part 11 and a surface of the surrounding part 12 away from the accommodating space S. In some embodiments, in addition to covering the surface of the bearing part 11 and the surface of the surrounding part 12 away from the accommodating space S, the outer sleeve 20 also covers one end of the surrounding part 12 away from the bearing part 11. The outer sleeve 20 covering the housing body 10 can not only increase the feeling of the grip but could also function as a buffer when the mobile device dropped. The housing body 10 with high hardness and low flexibility could maintain the overall shape of the magnetic housing for mobile device 100, allowing the magnetic housing for mobile device 100 to not be deformed.

In some embodiments, the inner lining 40 is disposed on a surface of the housing body 10 close to the accommodating space S. The inner lining 40 could be flannel. In some embodiments, the inner lining 40 comprises hot-pressed flannel. For example, the backside of the flannel can be coated with adhesive. The inner lining 40 can be hot-pressed to the surface of the housing body 10 close to the accommodating space S. The inner lining 40 covers the groove 13 of the housing body 10 and also covers the magnetic coil 30 disposed in the groove 13, thereby providing a buffering space and avoiding friction between the mobile device and the housing body 10.

Figure 4:
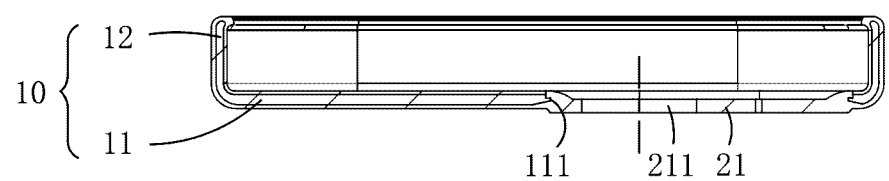
FIG. 4 is a cross-sectional view of the magnetic housing for mobile device along line B-B of FIG. 2.

FIG. 4 is a cross-sectional view of the magnetic housing for mobile device along line B-B of FIG. 2. Referring to FIG. 1 and FIG. 4, the bearing part 11 comprises a first opening 111, and the outer sleeve 20 comprises a first through hole disposing part 21. The first through hole disposing part 21 is corresponding to the first opening 111. The first through hole disposing part 21 comprises at least one first through hole 211. At least one first through hole 211 corresponds to a camera lens of the mobile device. As shown in FIG. 4, the first through hole disposing part 21 is embedded in the first opening 111. The first through hole disposing part 21 of this embodiment comprises a plurality of first through holes 211.

Figure 5:
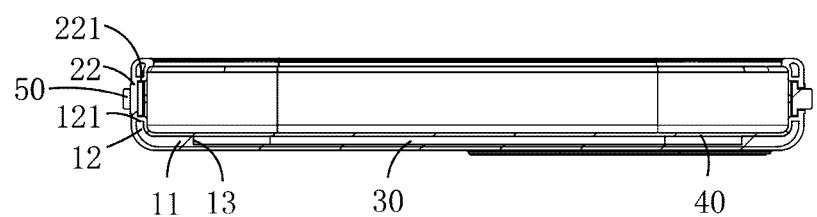
FIG. 5 is a cross-sectional view of the magnetic housing for mobile device along line C-C of FIG. 2.

FIG. 5 is a cross-sectional view of the magnetic housing for mobile device along line C-C of FIG. 2. Referring to FIG. 1 and FIG. 5, the surrounding part 12 comprises a second opening 121. The outer sleeve 20 comprises a second through hole disposing part 22. The second through hole disposing part 22 corresponds to the second opening 121. The second through hole disposing part 22 comprises at least one second through hole 221. The pressing member 50 is combined with the outer sleeve 20 and is disposed in the second through hole 221, so that the outer sleeve 20 with certain flexibility could position the pressing member 50 and could align with the second opening 121 of the housing body 10. The pressing member 50 is configured as a switch or button corresponding to the mobile device, to operate the electronic components and modules of the mobile device in accordance with pressing the switch or button of the mobile device. The second opening 121 could be an opening corresponding to the pressing member 50 and could be an interface corresponding to a charging cable or a signal cable. The pressing member 50 could correspond to a power switch or a volume adjustment switch.

Figure 6:
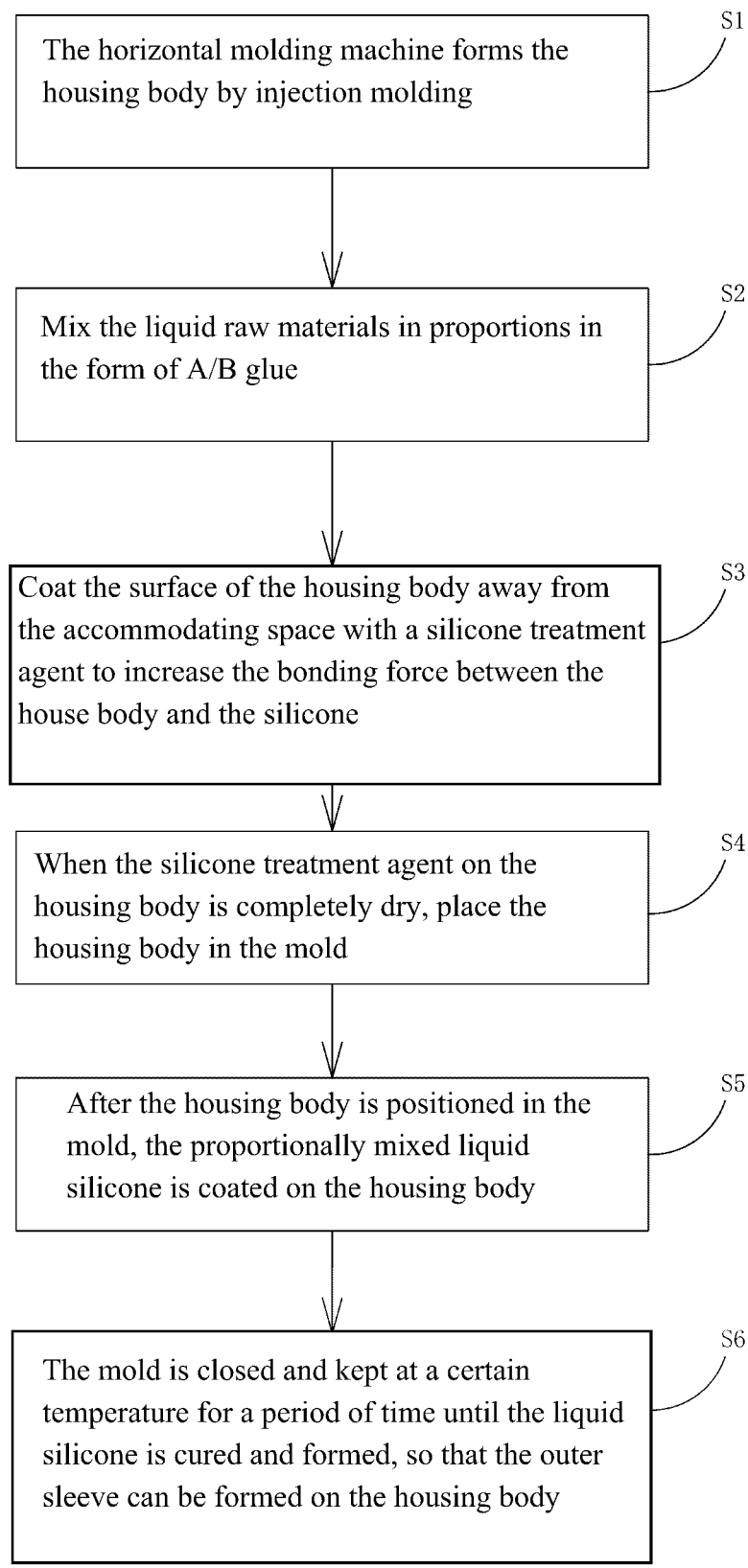
FIG. 6 is a flow chart of the manufacturing process of the magnetic housing for mobile device of the present disclosure.

The manufacturing process of the magnetic housing for mobile device of the present disclosure is as follows. FIG. 6 is a flow chart of the manufacturing process of the magnetic housing for mobile device of the present disclosure. In step S1, the housing body 10 is injection molded by a horizontal molding machine. Step S2 to step S6 showing the outer sleeve 20 is formed on the housing body 10 by solid silicone formed by liquid silicone in a liquid-to-solid molding manner of liquid silicone. The liquid-to-solid molding is, for example, liquid silica gel liquid-to-solid molding, with liquid material to be molded by the solid raw material molding method. The molding method for solid raw material is, for example, mold closing. In step S2, raw materials such as liquid silicone gel are mixed in proportion in the form of A/B glue. In step S3, a silicone treatment agent is coated on the surface of the housing body 10 away from the accommodating space S to increase the bonding force between the housing body 10 and the silicone. In step S4, when the silicone treatment agent on the housing body 10 is completely dried, the housing body 10 is disposed in the mold. In step S5, when the housing body 10 is positioned in the mold, the mixed liquid silicone gel is applied to the housing body 10. In step S6, the mold is closed and kept at a certain temperature for a period of time until the liquid silicone is cured and formed so that the outer sleeve 20 can be formed on the housing body 10.

In summary, embodiments of the present disclosure provide a magnetic housing for mobile device. By disposing grooves in the housing body with magnetic coils disposed in the grooves, the overall thickness of the housing for mobile device would not be increased when magnetic coils are disposed. The outer sleeve can be made by a liquid silicone liquid-to-solid molding method, which can further reduce the thickness of the housing for mobile device. Thus, the overall thickness of the housing for mobile device can be reduced to no thicker than 2.1 mm.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A magnetic housing for accommodating a mobile device, comprising:
    a housing body comprising a bearing part and a surrounding part, the surrounding part being connected to and intersecting with an outer periphery of the bearing part to form an accommodating space, the bearing part comprising a groove;
    an outer sleeve disposed on a surface of the housing body away from the accommodating space;
    a magnetic coil disposed in the groove, comprising a coil and a magnetic body; and
    an inner lining disposed on a surface of the housing body close to the accommodating space.

2. The magnetic housing according to claim 1, wherein the groove is disposed on a surface of the bearing part close to the accommodating space; and the inner lining covers the magnetic coil.

3. The magnetic housing according to claim 1, wherein the flexibility of the outer sleeve is greater than the flexibility of the housing body; and the hardness of the outer sleeve is less than the hardness of the housing body.

4. The magnetic housing according to claim 1, wherein the outer sleeve comprises a liquid-to-solid molded silicone; and the housing body comprises a polycarbonate.

5. The magnetic housing according to claim 1, wherein the inner lining comprises a hot-pressed flannel.

6. The magnetic housing according to claim 1, wherein the outer sleeve is disposed on a surface of the bearing part away from the accommodating space.

7. The magnetic housing according to claim 6, wherein the outer sleeve is further disposed on a surface of the surrounding part away from the accommodating space; and the outer sleeve covers one end of the surrounding part away from the bearing part.

8. The magnetic housing according to claim 1, wherein the inner lining is disposed on a surface of the bearing part close to the accommodating space.

9. The magnetic housing according to claim 8, wherein the inner lining is disposed on a surface of the surrounding part close to the accommodating space.

10. The magnetic housing according to claim 1, wherein the bearing part comprises a first opening; the outer sleeve comprises a first through hole disposing part corresponding to the first opening; and the first through hole disposing part comprises a first through hole.

11. The magnetic housing according to claim 10, wherein the first through hole disposing part is embedded in the first opening.

12. The magnetic housing according to claim 10, wherein the surrounding part comprises a second opening; the outer sleeve comprises a second through hole disposing part corresponding to the second opening; and the second through hole disposing part comprises a second through hole.

13. The magnetic housing according to claim 12, wherein the second through hole disposing part is embedded in the second opening.

14. The magnetic housing according to claim 12 comprising a pressing member, the pressing member being engaged with the outer sleeve and being disposed in the second through hole.

15. The magnetic housing according to claim 1, wherein the surrounding part comprises a second opening; the outer sleeve comprises a second through hole disposing part corresponding to the second opening; and the second through hole disposing part comprises a second through hole.

16. The magnetic housing according to claim 1, wherein the housing body is injection molded, and the outer sleeve is formed on the housing body by solid silicone formed by liquid silicone in a liquid-to-solid molding manner.

17. The magnetic housing according to claim 1, wherein a silicone treatment agent is coated on the surface of the housing body away from the accommodating space.

* * * * *